(12) United States Patent
Mui et al.

(10) Patent No.: US 7,265,879 B2
(45) Date of Patent: Sep. 4, 2007

(54) MULTIFUNCTION AUTOMATIC DOCUMENT FEEDER (ADF) SWITCH

(75) Inventors: Paul K. Mui, Boise, ID (US); Eric L. Andersen, Meridian, ID (US); Russell A. Mendenhall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 981 days.

(21) Appl. No.: 10/352,700

(22) Filed: Jan. 27, 2003

(65) Prior Publication Data

US 2004/0145786 A1 Jul. 29, 2004

(51) Int. Cl.
*H04N 1/04* (2006.01)

(52) U.S. Cl. .............. 358/496; 358/497; 358/486; 358/488

(58) Field of Classification Search ........... 358/496, 358/497, 486, 488, 474; 382/312, 318
See application file for complete search history.

(56) References Cited

U.S. PATENT DOCUMENTS

| | | | |
|---|---|---|---|
| 4,576,472 A * | 3/1986 | Ito et al. | 355/50 |
| 5,768,448 A | 6/1998 | Ichinose | |
| 5,914,791 A | 6/1999 | Lin | |
| 6,012,714 A | 1/2000 | Worley et al. | |
| 6,022,012 A | 2/2000 | Worley | |
| 6,057,944 A * | 5/2000 | Takeuchi | 358/468 |
| 6,128,455 A | 10/2000 | Horiguchi et al. | |
| 6,151,140 A | 11/2000 | Wilcox et al. | |
| 6,163,388 A * | 12/2000 | Lee et al. | 358/488 |
| 6,965,461 B1 * | 11/2005 | Chiang et al. | 358/497 |

* cited by examiner

*Primary Examiner*—Jerome Grant
*Assistant Examiner*—Houshang Safaipour

(57) ABSTRACT

A method and apparatus for an imaging device to automatically detect the presence of an automatic document feeder.

9 Claims, 6 Drawing Sheets

MULTIFUNCTION AUTOMATIC DOCUMENT FEEDER (ADF) SWITCH

BACKGROUND OF THE INVENTION

1. Field of the Invention

The present invention relates generally to imaging devices and, more specifically, to imaging devices to which an Automatic Document Feeder ("ADF") may be optionally attached.

2. State of the Art

An imaging device, such as a scanner, copier, facsimile machine, or the like, may include an ADF to automatically feed target media to the imaging device for processing, namely, scanning, copying, printing, faxing, or other printed material analysis. For example, an ADF attached to a scanner may feed each sheet of a document, one sheet at a time, to a flatbed imaging surface of the scanner and remove the sheet from the flatbed imaging surface once the imaging process of the scanner is complete. Thus, an ADF greatly reduces the amount of time required to process a target media with an imaging device.

An imaging device may include an ADF as an optional accessory that may be installed either by the manufacturer or the user of the imaging device. The installation process may include configuring the imaging device for use with the particular ADF attached to it by performing an adjustment and calibration procedure. The adjustment and calibration procedure may produce parameters used by the imaging device to compensate for changes in imaging quality and physical misalignments of target media during the imaging process. When an ADF is installed at the factory of the manufacturer, the imaging device may be configured by programming the presence of the ADF into the nonvolatile random access memory ("RAM") of the device's controller. Adjustment and calibration values for the particular ADF may also be programmed into the nonvolatile RAM as part of the installation.

When an optional ADF is installed onto an imaging device by a user, the imaging device's controller typically needs to detect the presence of the ADF before the controller will use the ADF to process a target media. Thus, a conventional user installation process may include manually selecting the ADF as the source of the target media or automatically detecting a signal when an ADF has been attached to the imaging device. An external communication cable connected between the ADF and imaging device during installation typically provides all electrical communication between the ADF and imaging device and may provide an ADF detection signal to the imaging device's controller.

However, in order to reduce the size and cost of the communication cable, the communication cable's connectors and mating connectors located on the ADF and imaging device, it is advantageous to limit the number of signals carried by the communication cable to the functional signals required for the normal operation of the ADF. Therefore, it is desirable to detect the presence of the ADF without adding an ADF detection signal to the communication cable.

BRIEF SUMMARY OF THE INVENTION

The present invention comprises a method and apparatus for an imaging device to automatically detect the presence of an ADF.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
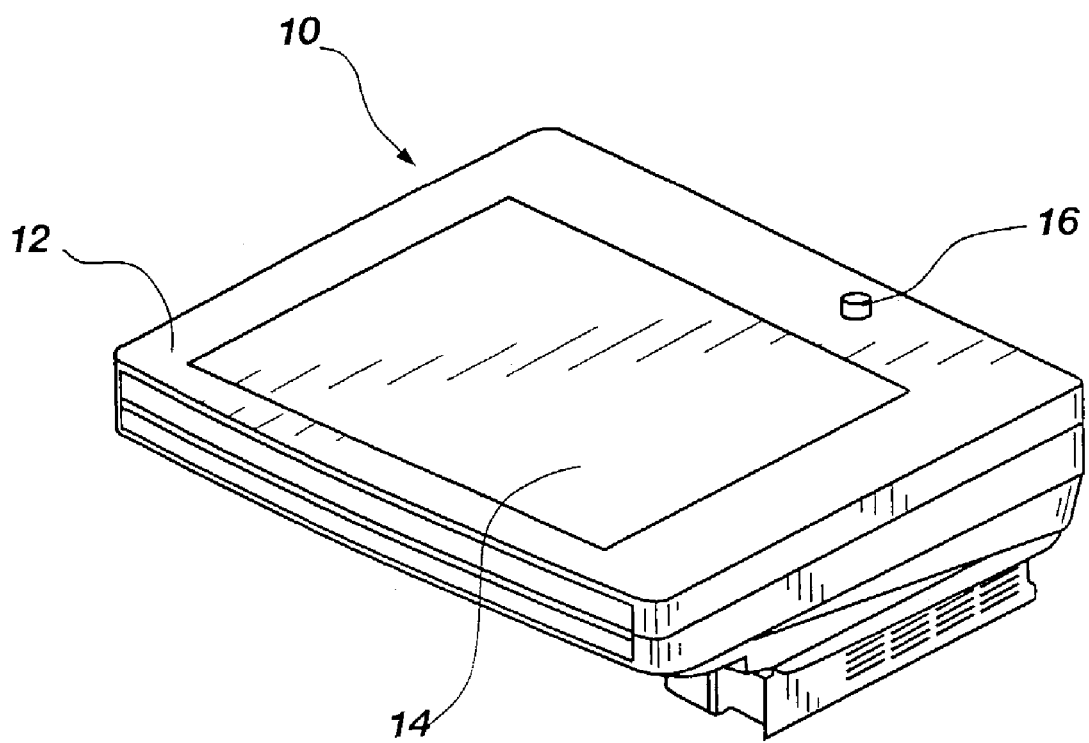
FIG. 1 is a perspective view of an imaging device in accordance with the present invention.

FIG. 1 illustrates a perspective view of an imaging device 10 according to the present invention comprising an ADF switch 16 located proximate to or in contact with an interface surface 12 of the imaging device 10. The interface surface 12 may be configured to interface with a cover (see FIGS. 6A-6C) or an ADF (see FIGS. 7A-7C), or to support a portion of a target medium (not shown). The interface surface 12 may include an imaging surface 14 where the target media may be placed for processing by the imaging device 10.

The ADF switch 16 may comprise, by way of example and not by limitation, a pushbutton switch, a rocker switch, a slide switch, a snap-action switch, a magnetic switch, a pressure sensor or any other detection switch or sensor that can detect the presence of an ADF. The ADF switch 16 may be configured to detect the presence of an ADF attached to the imaging device 10. Thus, the ADF switch 16 may be located on or proximate to the interface surface 12 so as to come in close proximity or contact with an attached ADF. Alternatively, the ADF switch 16 may be located on or proximate to any other surface of the imaging device 10 that interfaces with the ADF. For example, the ADF switch 16 may be part of a hinge (not shown) that attaches an ADF to the imaging device 10 and allows the ADF to open and close in relation to the interface surface 12. In such an embodiment, the hinge may be keyed so as to allow activation of the ADF switch 16 by an ADF while preventing activation by a replaceable attachment, such as a cover, attached to the hinge before the installation of an ADF. The ADF switch 16 may also be located so as to avoid inadvertent activation of the ADF switch 16 by, for example, an attached cover or a target medium being processed. As discussed in more detail below, the ADF switch 16 may also be configured to detect when an attached ADF is in an opened or closed position in relation to the interface surface 12.

Figure 2:
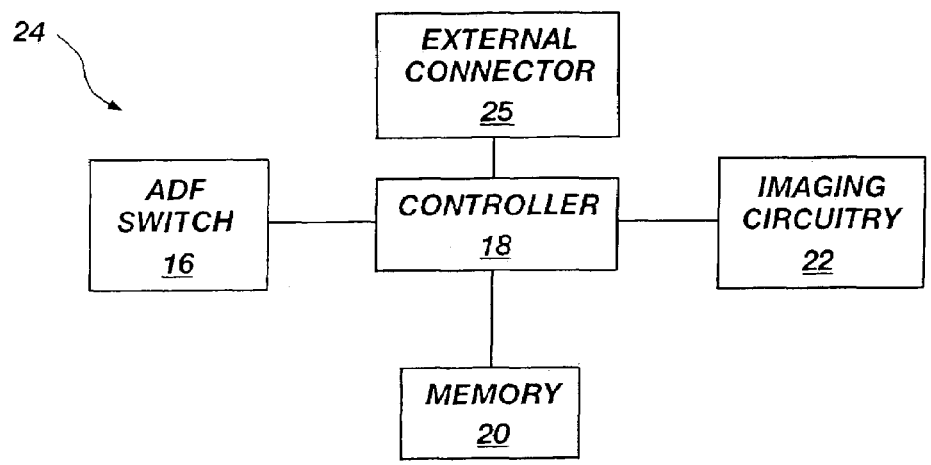
FIG. 2 is a block diagram of electrical circuitry of an embodiment of the imaging device of FIG. 1.

The imaging device 10 of FIG. 1 may further comprise electrical circuitry 24 as illustrated in the block diagram of FIG. 2. Electrical circuitry 24 may include a controller 18 electrically coupled to a memory device 20, imaging circuitry 22, external connector 25 and the ADF switch 16 shown in FIG. 1. The controller 18 may comprise, for example, a computer, microcontroller or microprocessor. The memory device 20 may comprise, for example, non-volatile Random Access Memory (RAM) and may be included as part of the controller 18 or as a separate device. The imaging circuitry 22 may include circuitry necessary for image processing, namely, scanning, copying, printing, faxing, or other printed material analysis. The external connector 25 may be configured to interface with peripheral devices such as, for example, an ADF.

The controller 18 may be configured to receive a signal from the ADF switch 16 indicating the presence of an ADF. The controller 18 may further be configured to store a parameter in the memory device 20 to indicate that an ADF has been detected. The controller 18 may also be configured to convert from a manual mode to an ADF mode once an ADF has been detected. Converting from manual mode to ADF mode may include performing an ADF adjustment and calibration procedure, collecting the adjustment and calibration parameters necessary for the imaging device 10 to control the detected ADF and storing the adjustment and calibration parameters in the memory device 20. The adjustment and calibration parameters may be used by the controller 18 during normal operation of an ADF to increase the quality of the imaging process. The controller 18 may be configured to initiate the adjustment and calibration procedure automatically upon receiving a signal from the ADF switch 16. Alternately, the controller 18 may be configured to prompt a user to initiate and perform the adjustment and calibration procedure through an operation panel (not shown) or an external computer (not shown) attached to the imaging device 10.

Figure 3:
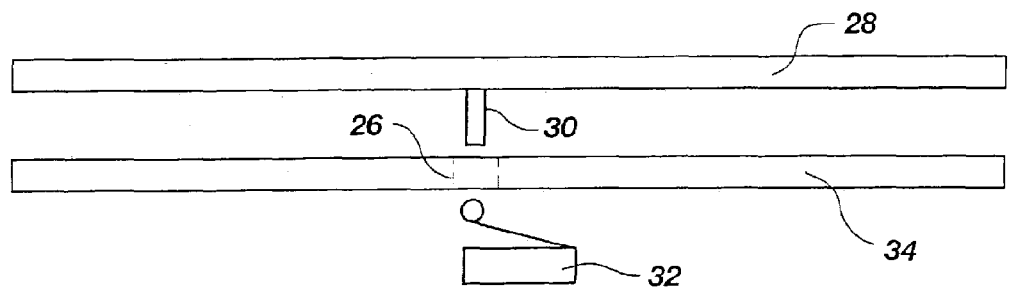
FIG. 3 is a partial side view of an embodiment of the imaging device of FIG. 1 and an ADF interface surface.

FIG. 3 illustrates a partial side view of an embodiment of the imaging device 10 of FIG. 1 and an ADF interface surface 28. In FIG. 3, an ADF switch 32 is located below an aperture 26 formed within an interface surface 34 of an imaging device. A portion of the ADF switch 32 may extend into the aperture 26, if desired. While FIG. 3 shows the ADF switch 32 as a snap-action switch, it may comprise any switch or sensor configured to be activated when touched or pressed by an activation element 30. For example, the ADF switch 32 may be activated when the activation element 30 is a protrusion of the ADF interface surface 28 that passes through the aperture 26 and presses down on the portion of the ADF switch 32 directly below the aperture 26.

Figure 4:
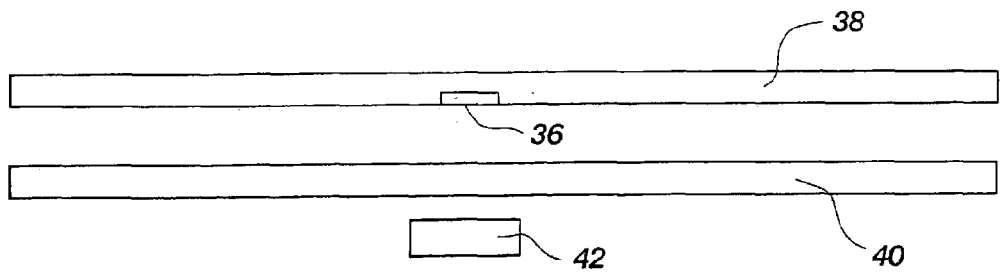
FIG. 4 is a partial side view of another embodiment of the imaging device of FIG. 1 and an ADF interface surface.

FIG. 4 illustrates a partial side view of another embodiment of the imaging device 10 of FIG. 1 and an ADF interface surface 38. In FIG. 4, an ADF switch 42 is located proximate an interface surface 40 of an imaging device. Although FIG. 4 shows the ADF switch 42 located below the interface surface 40, it may be located above the interface surface 42 or it may be partially or fully embedded within the interface surface 42. The ADF switch 42 may comprise any switch or sensor configured to be activated when an activation element 36 is place proximate the ADF switch 42. Thus, ADF switch 42 may be activated without making physical contact with an activation element. Activation element 36 may comprise, by way of example only and not by limitation, a reflective element, an electromagnetic element (e.g., infrared, radio frequency or microwave frequency radiation) or a magnetic element. For example, ADF switch 42 may comprise a magnetic switch configured to be activated when activation element 36 is a magnetic element placed proximate the ADF switch 42. Such an activation element 36 may be attached to or embedded within a portion of an ADF interface surface 38 in a location corresponding to the location of the ADF switch 42.

Figure 5:
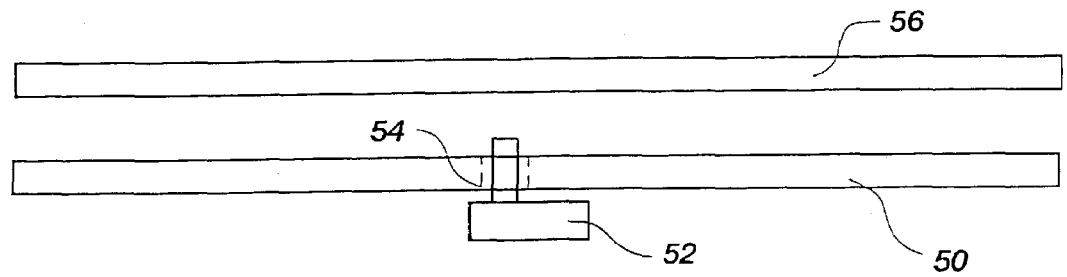
FIG. 5 is a partial side view of yet another embodiment of the imaging device of FIG. 1 and an ADF interface surface.

FIG. 5 illustrates a partial side view of yet another embodiment of the imaging device 10 of FIG. 1 and an ADF interface surface 56. In FIG. 5, a portion of an ADF switch 52 extends through an aperture 54 formed within an interface surface 50 of an imaging device. While FIG. 5 shows the ADF switch 52 as a pushbutton switch, it may comprise any switch or sensor configured to be activated when the portion of the ADF switch 52 extending through the aperture 54 is touched or pressed by an activation element. In this exemplary embodiment, the activation element may be a portion of an ADF interface surface 56 configured to activate the ADF switch 52 by pressing down on the portion of the ADF switch 52 extending through the aperture 54, as discussed in more detail below in relation to FIGS. 7A-7C.

Figure 6A:
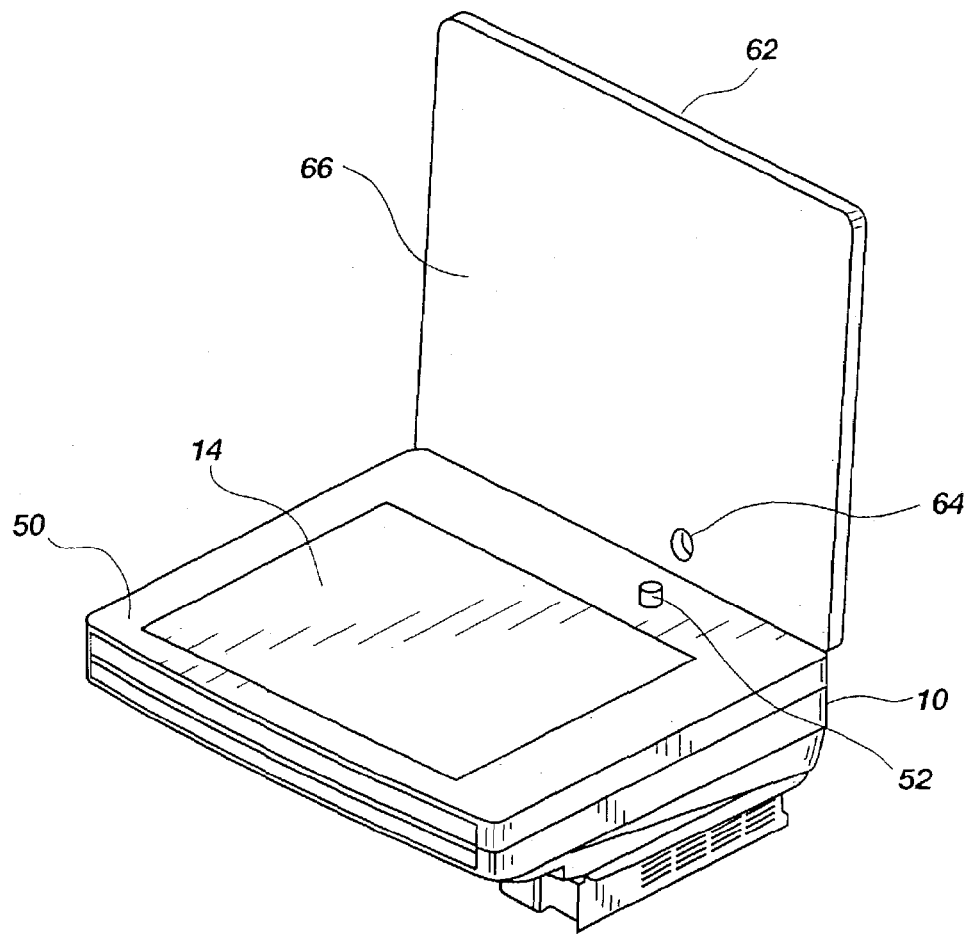
FIGS. 6A-6C are perspective views of the imaging device of FIG. 1 having an attached cover according to an embodiment of the present invention.
Figure 6B:
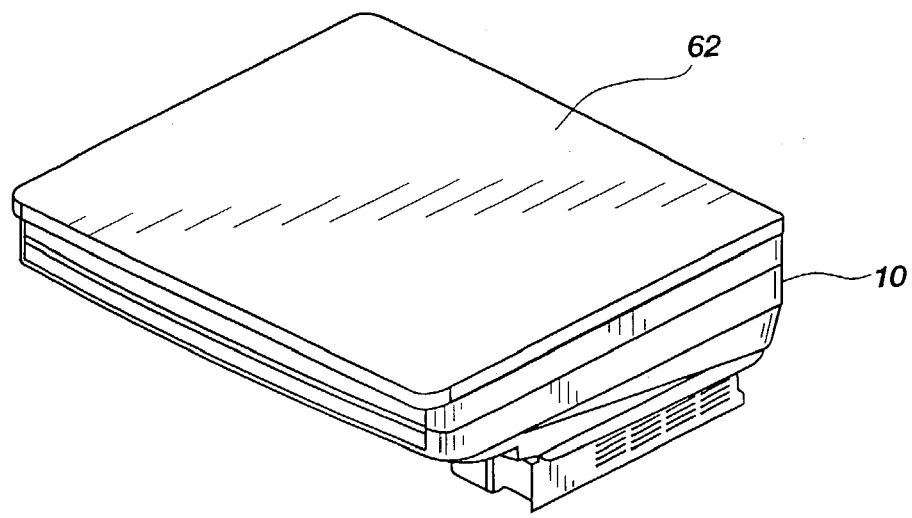
Figure 6C:
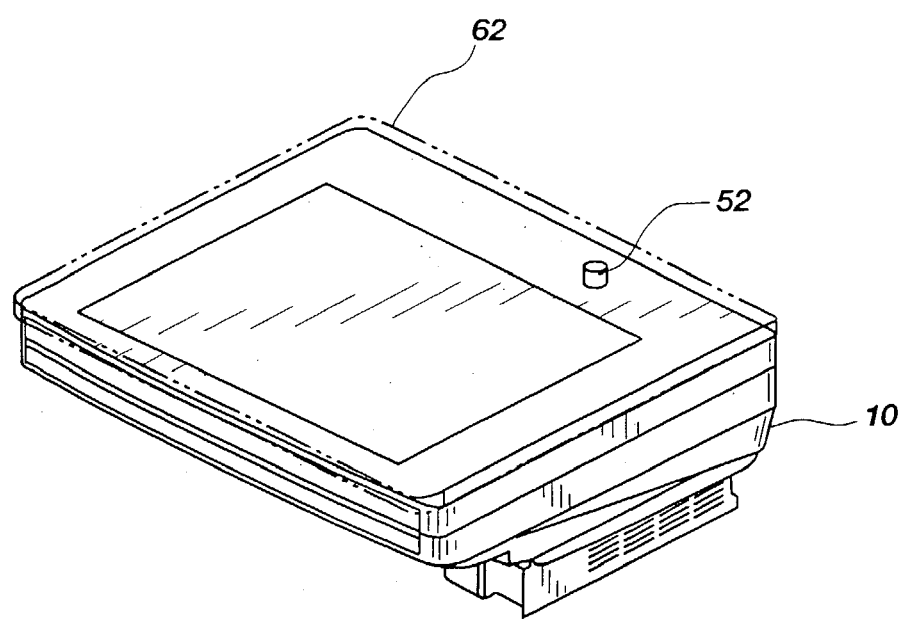

The imaging device 10 of FIG. 1 may include a replaceable attachment (not shown) configured to interface with the interface surface 12 of the imaging device 10. The replaceable attachment may be configured to be detached from the imaging device 10 when an optional ADF (not shown) is installed. For example, FIGS. 6A-6C show perspective views of the imaging device 10 of FIG. 1 having an attached cover 62. For illustrative purposes, the imaging device 10 shown in FIGS. 6A-6C employs the embodiment of FIG. 5. Thus, FIGS. 6A-6C show a portion of an ADF switch 52 extending through an interface surface 50 of the imaging device 10. The ADF switch 52 is configured to be activated when the portion of the ADF switch 52 extending through the interface surface 50 is pressed by an activation element. However, in order to prevent the false detection of an ADF, the cover 62 attached to the imaging device 10 does not have an activation element.

FIG. 6A illustrates the ADF switch 52 in the up or unpressed position and the cover 62 in the raised or open position, allowing manual access to the imaging surface 14. FIG. 6A also illustrates that a portion of the cover interface surface 66 has been removed to form an ADF switch relief hole 64. FIG. 6B shows the cover 62 in the lowered or closed position. The location of the ADF switch relief hole 64 is selected such that no part of the closed cover 62 touches or presses on the portion of the ADF switch 52 extending through the interface surface 50. Thus, cover interface surface 66 does not act as an activation element and the ADF switch 52 remains in the up position when the cover 62 is closed. FIG. 6C illustrates the cover in the closed position with the cover 62 being transparent so as to show the ADF switch 52 in the up position as it extends into the ADF switch relief hole 64 (not shown in FIG. 6C).

Figure 7A:
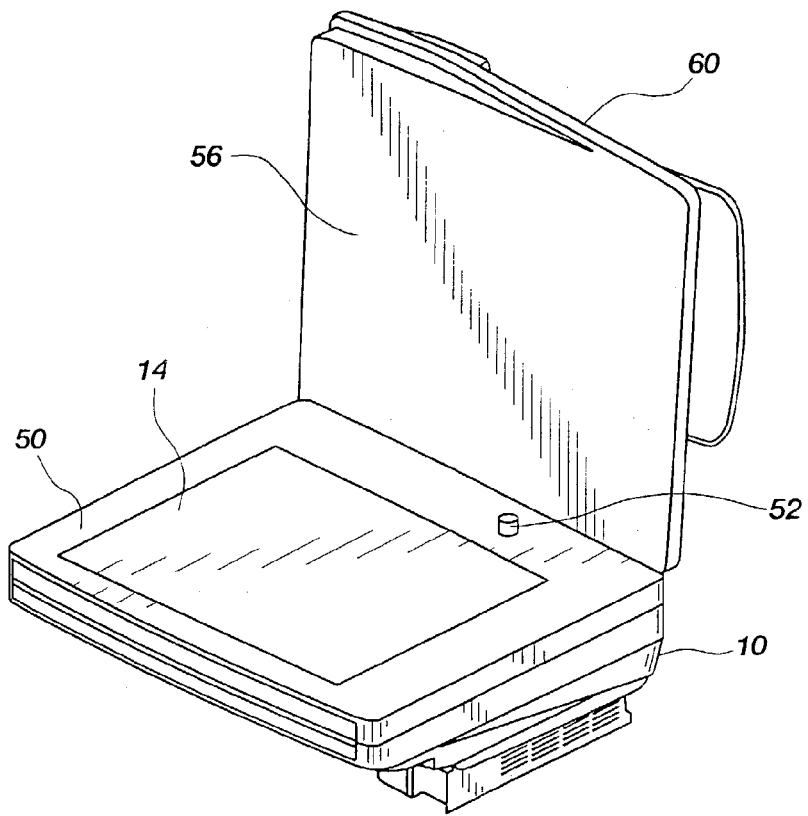
FIGS. 7A-7C are perspective views of the imaging device of FIG. 1 having an attached ADF according to an embodiment of the present invention.
Figure 7B:
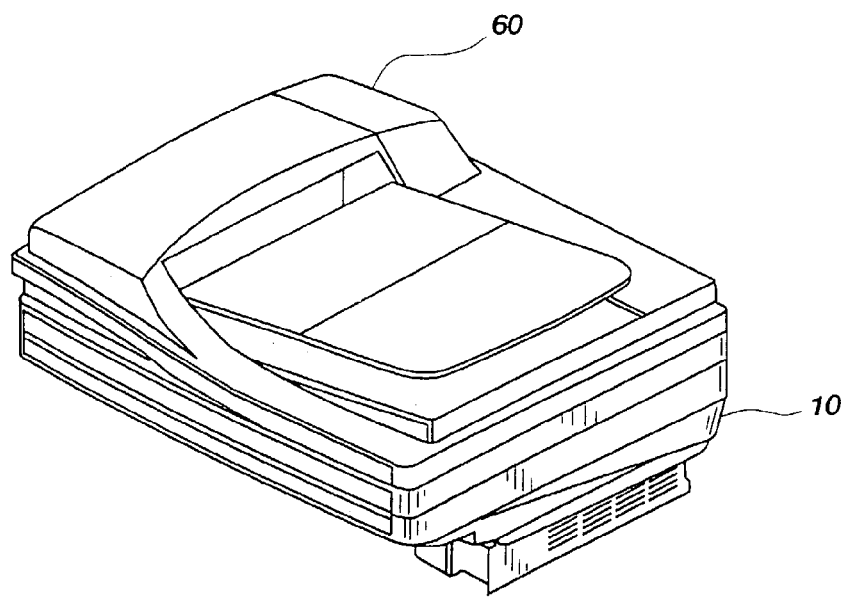
Figure 7C:
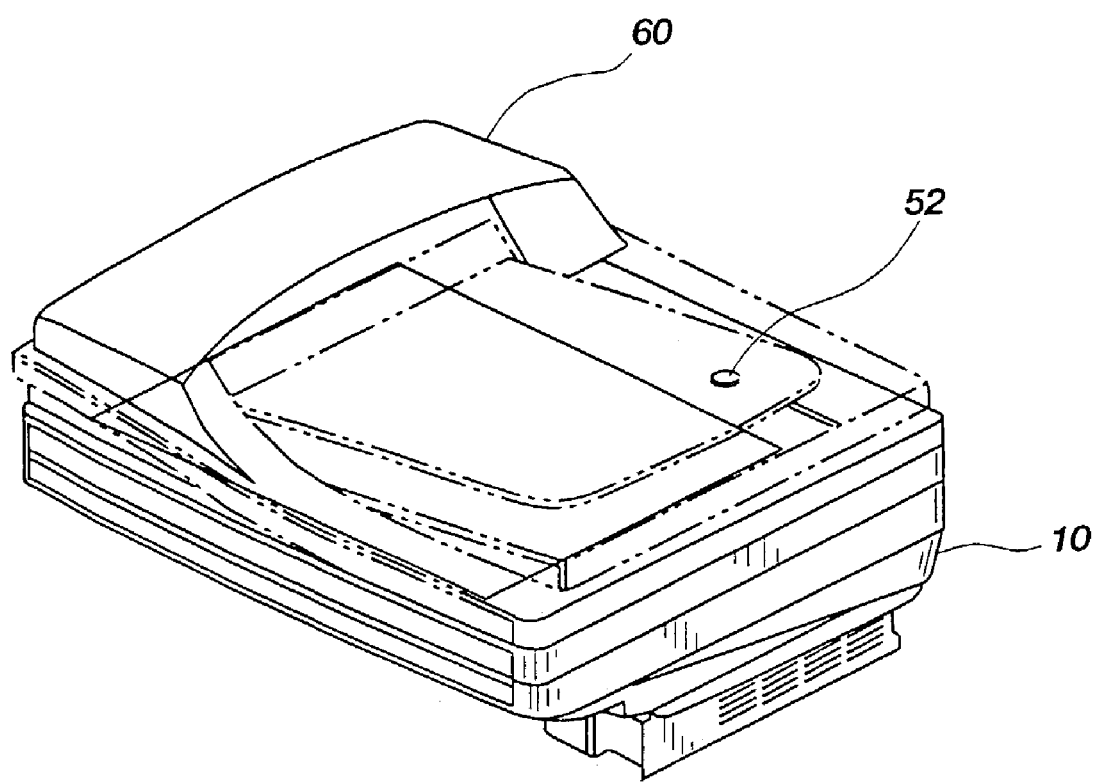

FIGS. 7A-7C illustrate the imaging device of FIGS. 6A-6C with the cover 62 replaced by an ADF 60. The ADF switch 52 is configured to be activated when the portion of the ADF switch 52 extending through the interface surface 50 is pressed by a portion of the ADF interface surface 56. FIG. 7A illustrates the ADF 60 in the open position and the ADF switch 52 in the up position. FIG. 7B illustrates the ADF 60 in the closed position. The closed position may also be referred to as the operating position since the ADF interface surface 56 is allowed to interface with the interface surface 50 of the imaging device 10 so that a target medium (not shown) can be transferred to and from the imaging surface 14. In the closed position, a portion of the ADF interface surface 56 presses down on the ADF switch 52, causing the ADF switch 52 to activate. FIG. 7C illustrates the ADF 60 in the closed position with a portion of the ADF 60 being transparent so as to show the ADF switch 52 in the down or activated position.

The imaging device 10 of FIGS. 7A-7C may initially be configured to be in a manual mode wherein the imaging device 10 will not attempt to control the ADF 60. However, upon attaching the ADF 60 and placing it in the closed position for the first time, the imaging device 10 may prompt a user to perform an ADF adjustment and calibration procedure. After the adjustment and calibration procedure is complete, the imaging device 10 may store adjustment and calibration parameters (see discussion of FIG. 2 above) for later use during normal operation of the ADF 60. Once the adjustment and calibration parameters have been stored, the imaging device 10 may convert from the manual mode to an ADF mode wherein the imaging device 10 controls the ADF 60 during a normal imaging process. In ADF mode, the imaging device 10 no longer needs to detect the presence of the ADF 60 or prompt the user to perform the ADF adjustment and calibration procedure each time the ADF switch 52 is activated. Rather, once in ADF mode, the imaging device 10 may be configured to identify the ADF 60 as being in the closed position when the ADF switch 52 is activated. Thus, in ADF mode, the ADF switch 52 may function as an open/close switch wherein the ADF 60 is determined to be ready for image processing when the ADF switch 52 is activated (e.g., when the ADF 60 is in the closed position).

Allowing the imaging device 10 to enter the ADF mode only upon completion of the adjustment and calibration procedure ensures that the image processing quality will be maintained when an optional ADF 60 is first attached to the imaging device 10. Further, requiring completion of the adjustment and calibration procedure prevents inadvertent entry into ADF mode when the ADF switch 52 is accidentally pressed. The imaging device 10 may also be configured to prevent inadvertent entry into ADF mode by requiring the ADF switch 52 to be activated for a predetermined length of time before the presence of the ADF 60 is determined to be detected.

Although the foregoing description contains many specificities, these should not be construed as limiting the scope of the present invention, but merely as providing illustrations of some of the presently preferred embodiments. Similarly, other embodiments of the invention may be devised which do not depart from the spirit or scope of the present invention indicated by the appended claims and their equivalents. All additions, deletions and modifications which fall within the meaning and scope of the claims are embraced within their scope.

What is claimed is:

1. An imaging device comprising:
   an interface surface;
   a switch configured to activate when the interface surface interfaces with a portion of an automatic document feeder ("ADF"); and
   a replaceable attachment configured to interface with the interface surface without activating the switch.

2. The imaging device of claim 1, wherein the replaceable attachment is configured to be detachable from the imaging device before an ADF is attached to the imaging device.

3. The imaging device of claim 1, wherein the replaceable attachment includes a relief hole configured to prevent contact between the replaceable attachment and the switch.

4. An imaging device comprising:
   a switch configured to detect an automatic document feeder ("ADF") interfacing with the imaging device;
   a controller electrically coupled to the switch; and
   a memory device electrically coupled to the controller;
   wherein the controller is configured to convert from a first mode to a second mode upon detection of an ADF by the switch,
   and wherein the controller is configured to complete an ADF adjustment and calibration procedure and store ADF adjustment and calibration parameters in the memory device before converting from the first mode to the second mode.

5. The imaging device of claim 4, wherein the controller is configured to prompt a user to perform the ADF adjustment and calibration procedure.

6. The imaging device of claim 4, wherein the controller is configured to initiate the ADF adjustment and calibration procedure automatically.

7. A method of automatically detecting an automatic document feeder ("ADF") interfacing with an imaging device, the method comprising:
   determining an activation of a switch by the ADF; and
   converting from a first mode to a second mode upon activation of the ADF; wherein converting from a first mode to a second mode comprises: initiating an ADF adjustment and calibration procedure when in a first mode;
   determining a completion of the adjustment and calibration procedure;
   storing ADF adjustment and calibration parameters upon completion of the adjustment and calibration procedure; and
   operating in the second mode.

8. The method of claim 7, wherein initiating the ADF adjustment and calibration procedure comprises prompting a user of the imaging device to perform the adjustment and calibration procedure.

9. The method of claim 7, wherein operating in the second mode comprises:
   determining activation of the switch by the ADF;
   identifying that the ADF is in an operating position; and
   controlling the ADF during an imaging process.

* * * * *